United States Patent
Jang et al.

(10) Patent No.: US 7,773,574 B2
(45) Date of Patent: Aug. 10, 2010

(54) SCHEDULING WIRELESS COMMUNICATION AMONG DELAY-SENSITIVE AND DELAY-INSENSITIVE TERMINALS

(75) Inventors: Kyung-Hun Jang, Suwon-si (KR); Pinyi Fan, Seongnam-si (KR); Zhigang Cao, Beijing (CN); Shufu Mao, Beijing (CN); Yung-Soo Kim, Seongnam-si (KR); Yongxing Zhou, Beijing (CN); Jianjun Li, Beijing (CN)

(73) Assignees: Samsung Electronics, Co., Ltd., Suwon-si (KR); Tsinghua University, Beijing (CN)

( * ) Notice: Subject to any disclaimer, the term of this patent is extended or adjusted under 35 U.S.C. 154(b) by 651 days.

(21) Appl. No.: 11/487,767

(22) Filed: Jul. 17, 2006

(65) Prior Publication Data
US 2007/0014236 A1    Jan. 18, 2007

(30) Foreign Application Priority Data
Jul. 15, 2005    (KR) .................... 10-2005-0064228

(51) Int. Cl.
*H04J 3/16* (2006.01)
*H04L 12/403* (2006.01)
*H04L 12/42* (2006.01)

(52) U.S. Cl. ...................... 370/346; 370/449

(58) Field of Classification Search ............. None
See application file for complete search history.

(56) References Cited

U.S. PATENT DOCUMENTS

| 6,980,513 | B2* | 12/2005 | Novick ............... 370/230 |
| 7,180,905 | B2* | 2/2007 | Benveniste ........... 370/445 |
| 7,245,946 | B2* | 7/2007 | Liu .................. 455/574 |
| 7,356,631 | B2* | 4/2008 | Lin .................. 710/243 |
| 7,421,273 | B2* | 9/2008 | Diepstraten et al. ... 455/445 |
| 2004/0156350 | A1 | 8/2004 | Brasic et al. |

OTHER PUBLICATIONS

Brian P. Crow et al., IEEE 802.11 Wireless Local Area Networks, 1997.

* cited by examiner

*Primary Examiner*—Ayaz R Sheikh
*Assistant Examiner*—Blanche Wong
(74) *Attorney, Agent, or Firm*—NSIP Law

(57) ABSTRACT

A scheduling method includes classifying, by a PC, terminals into delay-sensitive terminals and delay-insensitive terminals according to their traffic types; setting an initial value and a maximum value of a poll failure counter of each of the delay-sensitive terminals; polling each of the delay-sensitive terminals; determining whether there exists a delay-sensitive terminal of which a current value of the poll failure counter is less than the maximum value; and if there exists no delay-sensitive terminal of which the present value of the poll failure counter is less than the maximum value, sequentially polling the delay-sensitive terminals and the delay-insensitive terminals.

5 Claims, 5 Drawing Sheets

SCHEDULING WIRELESS COMMUNICATION AMONG DELAY-SENSITIVE AND DELAY-INSENSITIVE TERMINALS

PRIORITY

This application claims priority under 35 U.S.C. §119 to an application entitled "Voice Packet Scheduling Method For Wireless Local Area Network" filed in the Korean Intellectual Property Office on Jul. 15, 2005 and assigned Serial No. 2005-64228, the contents of which are incorporated herein by reference.

BACKGROUND OF THE INVENTION

1. Field of the Invention

The present invention relates generally to a wireless local area network (WLAN) system, and in particular, to a scheduling method for guaranteeing the reliability of voice packet transmission in a WLAN system.

2. Description of the Related Art

Given the rapid spread of WLAN systems, ongoing research for supporting real time services, such as a voice call, which is very sensitive to delay, is underway. A rapid growth of a wireless network market has resulted in the implementation of the Institute of Electrical and Electronics Engineers (IEEE) 802.11 standard for WLAN systems. in 1997. The IEEE 802.11 standard describes the specifications of a media access control (MAC) layer and a physical (PHY) layer for WLAN systems. IEEE 802.11 WLAN operates using dual channel access mechanisms, i.e., a distributed coordination function (DCF) mode and a point coordination function (PCF) mode. The DCF mode is based on a carrier sense multiple access with collision avoidance (CSMA/CA) channel access mechanism, while the PCF is based on a polling mechanism.

A DCF mode operates in a distributed manner and is a basic channel access mechanism of WLAN. However, it is difficult to guarantee quality of service (QoS) in the DCF mode. Thus, a significant problem can occur when a WLAN must transmit real-time traffic. In general, a typical WLAN system having an 11 Mbps bandwidth can support Voice over Internet Protocol (VoIP) connection very restrictively in the DCF mode. For this reason, the DCF is a mechanism for which it is difficult to satisfy QoS required in the real-time traffic.

A PCF mode is an alternative for transmitting real-time traffic in a IEEE 802.11 WLAN system and is a suitable mechanism for supporting a voice service based on a central control.

FIG. 1 is a conceptual diagram for explaining DCF and PCF mode operations as defined in the IEEE 802.11 standard.

In the PCF mode, a point coordinator (PC) is required as a central control office. Although any node in a network can be the PC, in a system set as an infrastructure network including an access point (AP), the AP generally plays a role of the PC.

A period in which the system operates in the PCF mode is a contention free period (CFP), while a period in which the system operates in the DCF mode is a contention period (CP). A super frame includes the CFP and the CP. Each CFP begins from beacon frame transmission, and the CFP and the CP are alternates. At a predetermined time, the PC generates a beacon frame B, which is defined by a CFP repetition interval (CFPRI) parameter and determines a target beacon transmission time (TBTT). The length of the CFP is determinable by the size of an available traffic and polling list. The PC can terminate a CFP during or before the maximum duration (CFPMaxDuration).

However, since a polling list scheduling mechanism has not been defined in detail in the PCF mode for the IEEE 802.11 standard, research concerning the polling list scheduling mechanism is ongoing.

A conventional round robin mechanism can be considered for the PCF mode scheduling. However, the round robin mechanism is ineffective since voice and data traffic is processed in the same manner, and in particular, a round robin algorithm generates a long packet delay and has a high dropping probability in a high-load environment.

To address this processing delay problem, various round-robin-based scheduling mechanisms have been suggested. However, no suggested mechanism satisfy the improvement of the packet delay and dropping probability, which are disadvantages of the round robin mechanism, to be applied to real-time traffic transmission in WLAN.

SUMMARY OF THE INVENTION

An object of the present invention is to substantially solve at least the above problems and/or disadvantages as well as to provide at least the advantages below. Accordingly, an object of the present invention is to provide a scheduling method for providing reliable QoS for real-time traffic, such as VoIP, in a WLAN system.

Another object of the present invention is to provide a scheduling method for a WLAN for providing a reliable voice call service by minimizing an average packet transmission delay and a packet dropping probability.

According to an aspect of the present invention, there is provided a scheduling method including classifying, by a point coordinator (PC), terminals into delay-sensitive terminals and delay-insensitive terminals according to their traffic types; setting an initial value and a maximum value of a poll failure counter of each of the delay-sensitive terminals; determining whether a current value of the poll failure counter of each of the delay-sensitive terminals is less than the maximum value; if the current value is less than the maximum value, transmitting a polling packet to a relevant delay-sensitive terminal; determining whether a response packet in response to the polling packet is received from the delay-sensitive terminal; if the response packet is received, initializing the poll failure counter of the delay-sensitive terminal to 0; if the response packet is not received, increasing the poll failure counter of the delay-sensitive terminal by 1; determining whether there exists a delay-sensitive terminal of which a current value of the poll failure counter is less than the maximum value; if there exists no delay-sensitive terminal of which the current value of the poll failure counter is less than the maximum value, sequentially polling the delay-sensitive terminals and the delay-insensitive terminals; resetting the poll failure counters of the delay-sensitive terminals to 0 after polling the delay-sensitive terminals and the delay-insensitive terminals; and returning to the step of polling each of the delay-sensitive terminals.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Preferred embodiments of the present invention will be described herein below with reference to the accompanying drawings.

Figure 1:
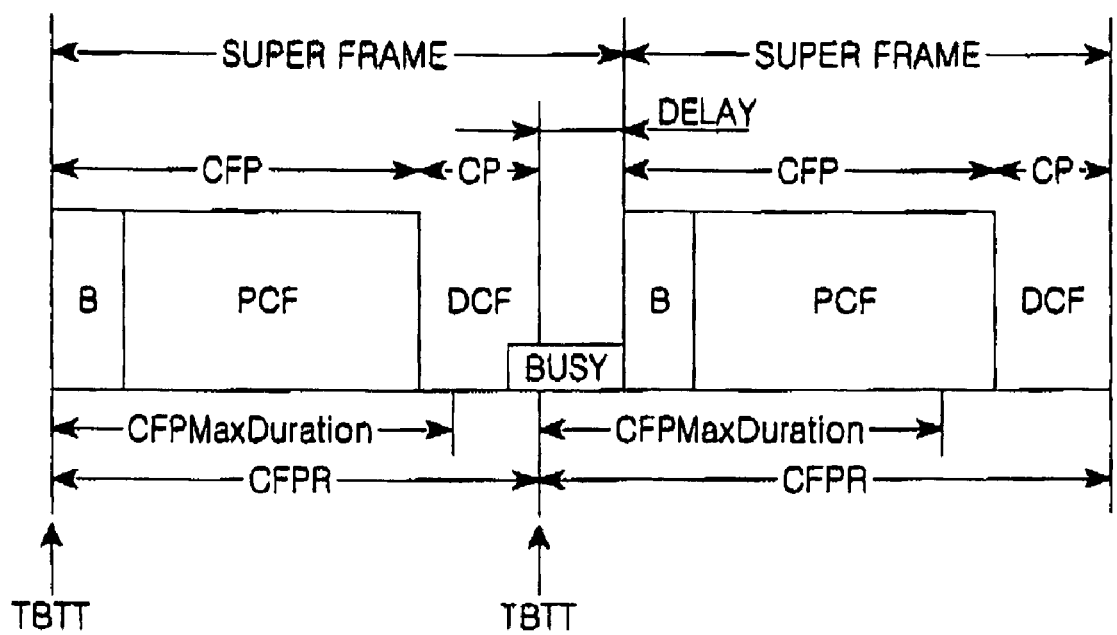
FIG. 1 is a conceptual diagram for explaining DCF and PCF mode operations defined in the IEEE 802.11 standard.
Figure 2A:
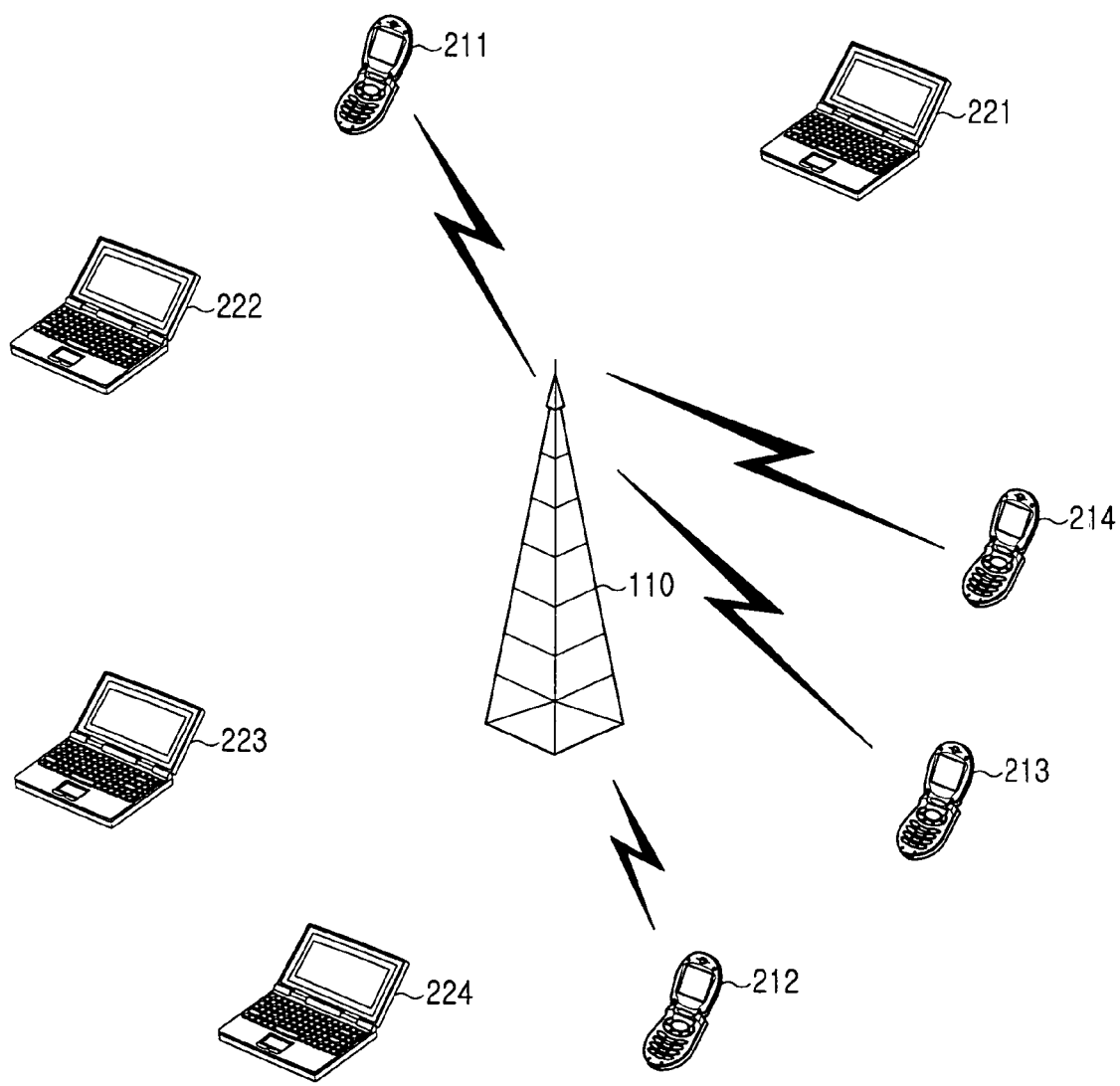
FIG. 2A is a configuration for explaining a polling process in a priority polling mode in a voice packet scheduling method according to the present invention.
Figure 2B:
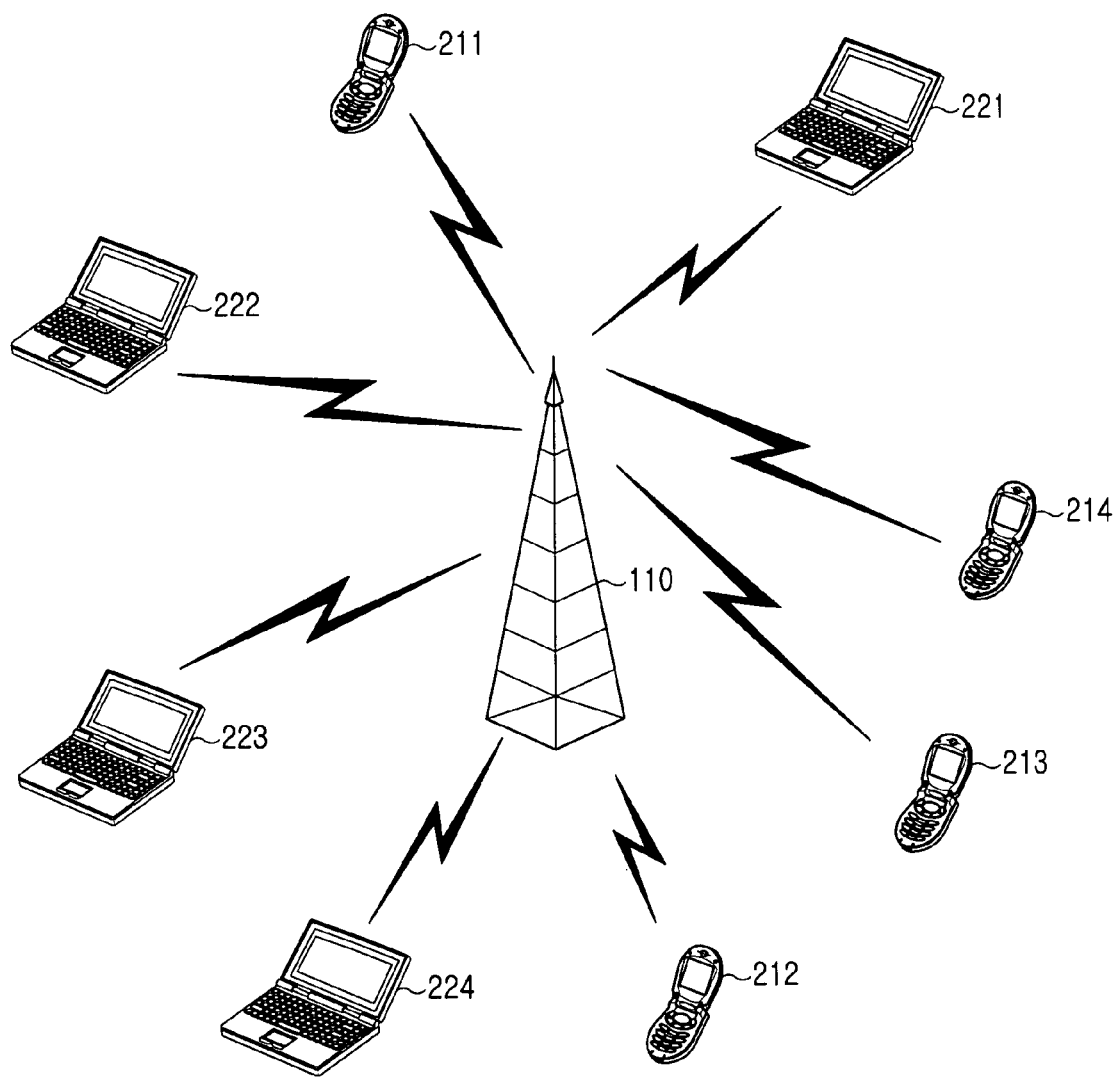
FIG. 2B is a configuration for explaining a polling process in a regular polling mode in the voice packet scheduling method according to the present invention.

FIGS. 2A and 2B are configurations for explaining polling processes in a priority polling mode and a regular polling mode in a voice packet scheduling method according to the present invention. As illustrated in FIGS. 2A and 2B, in the voice packet scheduling method in a WLAN system according to a preferred embodiment of the present invention, terminals are classified into two groups. That is, terminals 211, 212, 213, and 214 requiring a delay-sensitive traffic service are classified as a delay-sensitive terminal group, and terminals 221, 222, 223, and 224 requiring a delay-insensitive traffic service are classified as a delay-insensitive terminal group.

A delay-sensitive terminal is a terminal requiring a service of which a transmission delay is not allowed, such as a voice call or a video conference. A delay-insensitive terminal is a terminal requiring a service of which quality is affected minimally by a delay, such as Internet access or file transmission.

In the current embodiment, an access point (AP) 110 as a point coordinator (PC) operates in two polling modes, i.e., a priority polling mode and a regular polling mode.

As illustrated in FIG. 2A, in the priority polling mode, the PC 110 activates a poll failure counter PollFail of each of the delay-sensitive terminals 211, 212, 213, and 214. If a polling process succeeds for each of the delay-sensitive terminals 211, 212, 213, and 214, the PC 110 resets the poll failure counter PollFail of each of the delay-sensitive terminals 211, 212, 213, and 214 to 0, and if the polling process fails for any of the delay-sensitive terminals 211, 212, 213, and 214, the PC 110 increases a relevant poll failure counter PollFail by 1.

In the priority polling mode, the PC 110 sequentially performs the polling process for only delay-sensitive terminals of which a present value of the poll failure counter PollFail is less than a pre-set maximum value PollFailMax among the delay-sensitive terminals 211, 212, 213, and 214 included in the delay-sensitive terminal group.

For example, if PollFailMax is 2, and if a present value of the poll failure counter PollFail of the terminal 213 among the delay-sensitive terminals 211, 212, 213, and 214 is 2, the PC 110 performs the polling process for only the remaining delay-sensitive terminals 211, 212, and 214 except the terminal 213.

If there exists no terminal of which a current value of the poll failure counter PollFail is less than PollFailMax among the delay-sensitive terminals 211, 212, 213, and 214, the PC 110 changes the polling mode from the priority polling mode to the regular polling mode.

As illustrated in FIG. 2B, in the regular polling mode, the PC 110 sequentially performs the polling process for the delay-sensitive terminals 211, 212, 213, and 214 and the delay-insensitive terminals 221, 222, 223, and 224. Upon completion of the polling process for all the terminals, the PC 110 resets the poll failure counters PollFail of the delay-sensitive terminals 211, 212, 213, and 214 to 0 and moves into the priority polling mode.

In the priority polling mode or the regular polling mode, the PC 110 determines whether there exists data to be transmitted to a terminal for which the polling process has succeeded, and if there exists data to be transmitted, the PC 110 transmits a data packet and a poll packet to the terminal, and if there does not exist data to be transmitted, the PC 110 transmits only a poll packet to the terminal.

If the poll packet is received, the terminal transmits a data packet and an acknowledgement (ACK) packet to the PC 110 if there exists data to be transmitted and transmits only an ACK packet to the PC 110 if there does not exist data to be transmitted.

Figure 3:
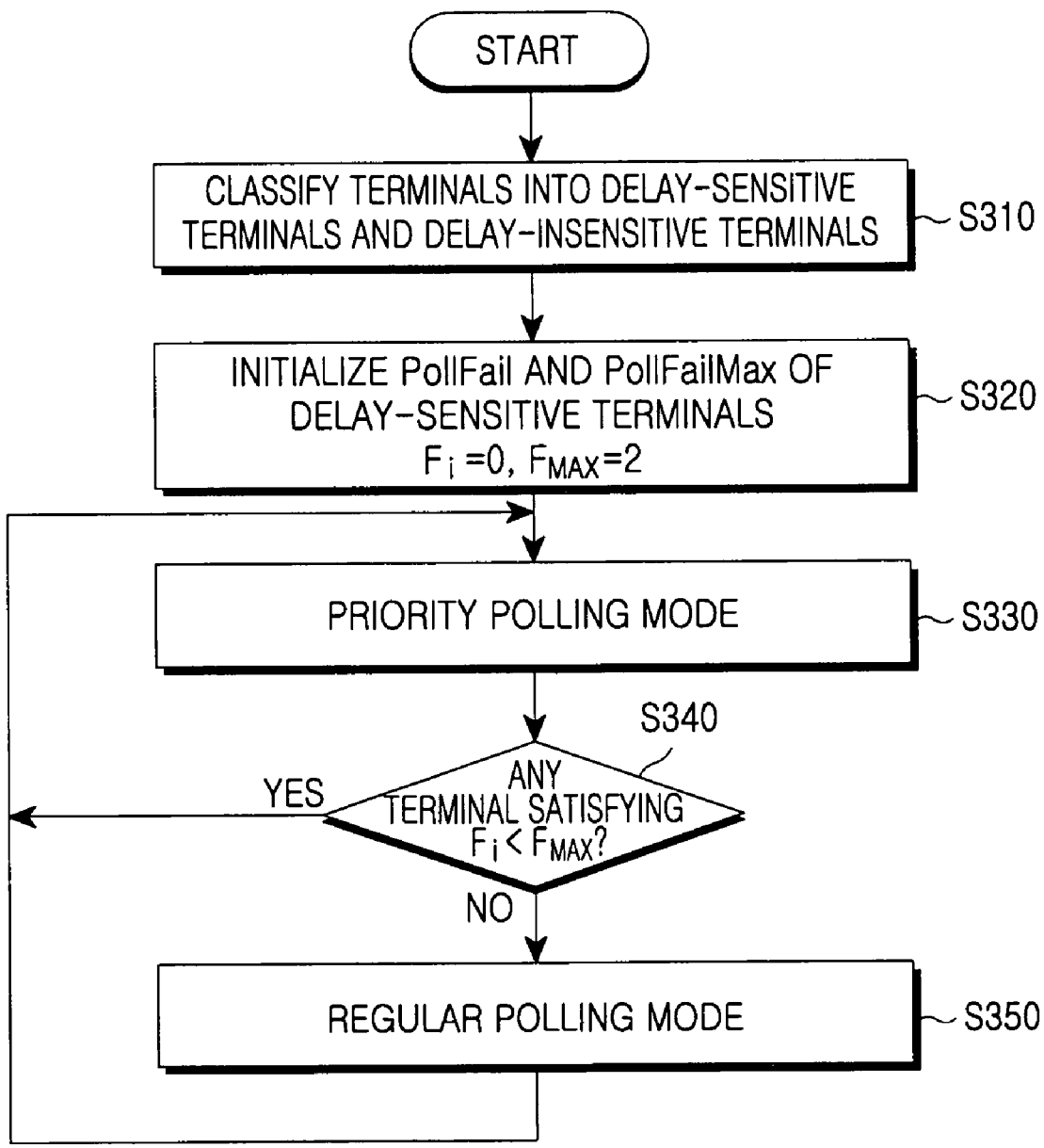
FIG. 3 is a flowchart illustrating the voice packet scheduling method according to the present invention.

FIG. 3 is a flowchart illustrating the voice packet scheduling method according to the present invention. Referring to FIG. 3, a PC classifies terminals into delay-sensitive terminals and delay-insensitive terminals according to required services in step S310, initializes the poll failure counters ($F_i=0$) of the delay-sensitive terminals and the maximum value ($F_{MAX}=2$) of the poll failure counters in step S320, and goes into the priority polling mode in step S330. Herein, i denotes a delay-insensitive terminal index.

When the PC goes into the priority polling mode, in step S340, the PC determines in every polling round whether terminals satisfying $F_i<F_{MAX}$ exist. If no terminal satisfying $F_i<F_{MAX}$ exists, in step 350, the PC goes into the regular polling mode.

Figure 4:
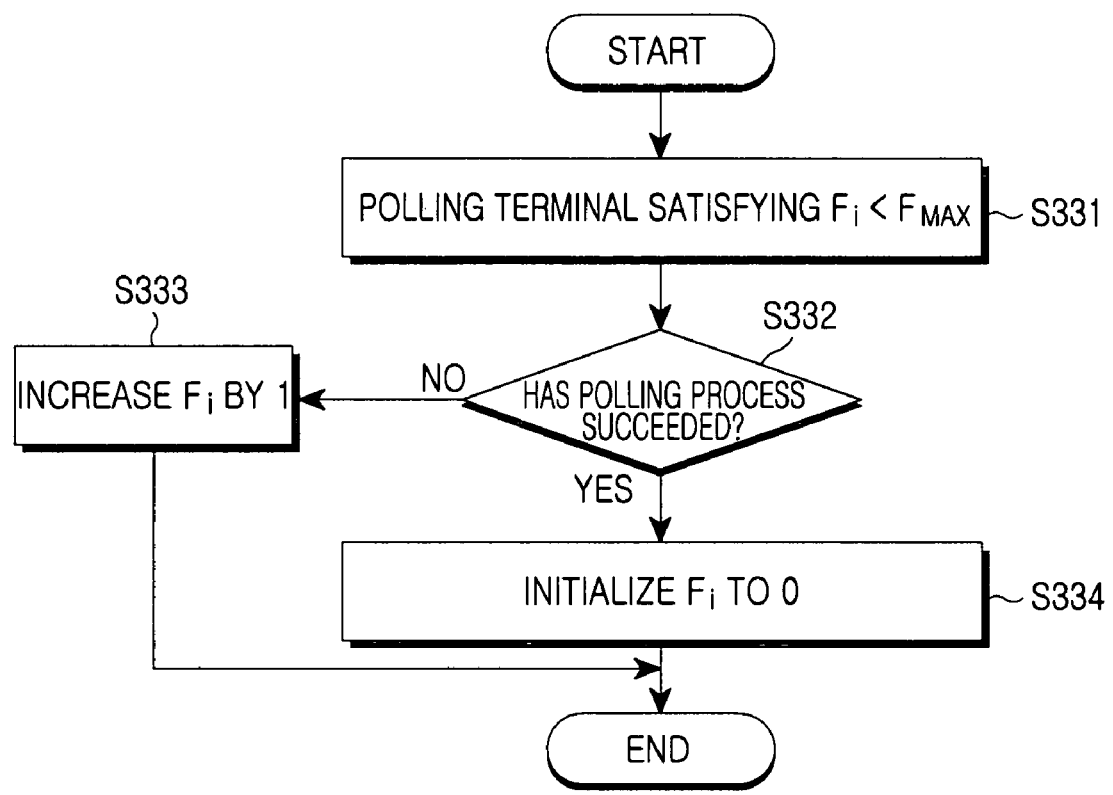
FIG. 4 is a flowchart illustrating an operation of a PC for terminals in the priority polling mode of FIG. 3, according to the present invention.

FIG. 4 is a flowchart illustrating an operation of the PC for terminals in the priority polling mode of FIG. 3, according to the present invention.

Referring to FIG. 4, in the priority polling mode, the PC performs a polling process for each terminal satisfying $F_i<F_{MAX}$ in step S331 and determines in step S332 whether the polling process has succeeded. If the polling process has succeeded, the PC initializes the poll failure counter of the terminal for which the polling process has succeeded ($F_i=0$) in step S334, and if the polling process has not succeeded, the PC increases by 1 the poll failure counter of the terminal for which the polling process has failed in step S333.

In the regular polling mode, the PC sequentially performs the polling process for the delay-sensitive terminals and the delay-insensitive terminals, and if the polling process has succeeded for all of the terminals, the PC resets the poll failure counter of the delay-sensitive terminals to 0 and goes into the priority polling mode.

As described above, in a voice packet scheduling method according to the present invention, by classifying terminals according to required services and determining whether to poll terminals requiring a delay-sensitive traffic service according to traffic generation patterns of the terminals, an average packet delay and a dropping probability can be minimized even in a high-load environment. In addition, QoS of voice packet transmission in an IP network can be guaranteed by granting priority to terminals generating traffic in reality according to traffic patterns of the terminals and polling the terminals in a round robin mechanism.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A scheduling method by a point coordinator (PC) of a wireless communication system including a plurality of terminals and the PC for providing a network access service to the terminals, the scheduling method comprising the steps of:
   classifying the terminals into delay-sensitive terminals and delay-insensitive terminals according to their traffic types;
   setting an initial value and a maximum value of a poll failure counter of each of the delay-sensitive terminals;
   polling each of the delay-sensitive terminals;
   determining whether there exists a delay-sensitive terminal of which a present value of the poll failure counter is less than the maximum value; and
   if there exists no delay-sensitive terminal of which the present value of the poll failure counter is less than the maximum value, sequentially polling the delay-sensitive terminals and the delay-insensitive terminals,
   if the present value is less than the maximum value at any of the delay-sensitive terminals, the polling of each of the delay-sensitive terminals comprises:
      transmitting a polling packet to each delay-sensitive terminal where the present value is less than the maximum value;
      determining whether a response packet responsive to the polling packet is received from the delay-sensitive terminal;
      if the response packet is received, initializing the poll failure counter of the delay-sensitive terminal to 0; and
      if the response packet is not received, increasing the poll failure counter of the delay-sensitive terminal by 1.

2. The scheduling method of claim 1, wherein the setting the initial value and a maximum value of a poll failure counter of each of the delay-sensitive terminals includes setting the initial value of the poll failure counter to 0.

3. The scheduling method of claim 1, further comprising:
   resetting the poll failure counters of the delay-sensitive terminals to 0 after the sequential polling of the delay-sensitive terminals and the delay-insensitive terminals; and
   returning to the step of polling each of the delay-sensitive terminals.

4. A scheduling method by a point coordinator (PC) of a wireless communication system including a plurality of terminals and the PC for providing a network access service to the terminals, the scheduling method comprising the steps of:
   classifying the terminals into delay-sensitive terminals and delay-insensitive terminals according to their traffic types;
   setting an initial value and a maximum value of a poll failure counter of each of the delay-sensitive terminals;
   determining whether a present value of the poll failure counter of each of the delay-sensitive terminals is less than the maximum value;
   if the present value is less than the maximum value at any of the delay sensitive terminals, transmitting a polling packet to each delay-sensitive terminal where the present value is less than the maximum value;
   determining whether a response packet responsive to the polling packet is received from the delay-sensitive terminal;
   if the response packet is received, initializing the poll failure counter of the delay-sensitive terminal to 0;
   if the response packet is not received, increasing the poll failure counter of the delay-sensitive terminal by 1;
   determining whether there exists a delay-sensitive terminal of which a present value of the poll failure counter is less than the maximum value;
   if there exists no delay-sensitive terminal of which the present value of the poll failure counter is less than the maximum value, sequentially polling the delay-sensitive terminals and the delay-insensitive terminals;
   resetting the poll failure counters of the delay-sensitive terminals to 0 after the sequential polling of the delay-sensitive terminals and the delay-insensitive terminals; and
   returning to the step of polling each of the delay-sensitive terminals.

5. A system for scheduling wireless communication, comprising:
   at least one delay-sensitive terminal;
   at least one delay-insensitive terminal; and
   a points coordinator (PC),
   wherein the PC is configured to poll each of the at least one delay sensitive terminals, and, in response to none of the at least one delay sensitive terminals having a value of a poll failure counter that is less than a predetermined maximum value, the PC is further configured to sequentially poll the at least one delay sensitive terminal and the at least one delay insensitive terminal,
   wherein the PC is configured to determine whether a current value of the poll failure counter of each of the at least one delay-sensitive terminals is less than the predetermined maximum value, transmit a polling packet to each delay-sensitive terminal where the current value is less than the predetermined maximum value, determine whether a response packet responsive to the polling packet is received from one of the delay-sensitive terminals where the current value is less than the predetermined maximum value, initialize the poll failure counter of the delay-sensitive terminal where the current value is less than the predetermined maximum value to 0 if the response packet is received, and increase the poll failure counter of the delay-sensitive terminal where the current value is less than the predetermined maximum value by 1 if the response packet is not received.

* * * * *